(12) United States Patent
Antoine et al.

(10) Patent No.: US 7,835,930 B2
(45) Date of Patent: Nov. 16, 2010

(54) METHOD OF CONVERTING A RESOURCE INTO A PRODUCT

(75) Inventors: Marc Antoine, Gebenstorf (CH); Geir Hovland, Highgate Hill (AU)

(73) Assignee: ABB Research Ltd, Zurich (CH)

( * ) Notice: Subject to any disclaimer, the term of this patent is extended or adjusted under 35 U.S.C. 154(b) by 1258 days.

(21) Appl. No.: 10/570,874

(22) PCT Filed: Sep. 8, 2004

(86) PCT No.: PCT/CH2004/000566

§ 371 (c)(1),
(2), (4) Date: Mar. 7, 2006

(87) PCT Pub. No.: WO2005/024535

PCT Pub. Date: Mar. 17, 2005

(65) Prior Publication Data

US 2006/0253268 A1    Nov. 9, 2006

(30) Foreign Application Priority Data

Sep. 8, 2003 (EP) .................................. 03405654

(51) Int. Cl.
*G06F 9/44* (2006.01)
(52) U.S. Cl. .................. 705/7; 705/10; 705/11
(58) Field of Classification Search ............ 705/7, 705/10, 11
See application file for complete search history.

(56) References Cited

U.S. PATENT DOCUMENTS 4,776,171 A * 10/1988 Perry et al. ............... 60/698

2001/0032109 A1* 10/2001 Gonyea et al. ............ 705/8
2003/0004659 A1* 1/2003 Hayashi et al. .......... 702/60
2003/0236721 A1* 12/2003 Plumer et al. ............ 705/30

FOREIGN PATENT DOCUMENTS

EP    1 406 136 A1    4/2004

OTHER PUBLICATIONS

"Real-Time On-line performance Diagnostics of Heavy-Duty Industrial Gas Turbines", by S. Can Gulen and Sal Paolucci; Presented at the International Gas Turbine & Aeroengine Congress & Exhibition, Munich, Germany, May 2000.*
"Optimal Preventive Maintenance Planning for Multiple Elevators", Hajime Yamashine, Kyoto University, Kyoto, Japan; Shunsuke Otani, Fujitec Co. Ltd. Osaka, Japan; Journal of Quality in Maintenance Engineering, Vo. 7 No. 2, 2001, pp. 128-150.*

(Continued)

*Primary Examiner*—Romain Jeanty
*Assistant Examiner*—Pan Choy
(74) *Attorney, Agent, or Firm*—Buchanan Ingersoll & Rooney PC

(57) ABSTRACT

The present invention is concerned in particular with the scheduling of maintenance actions such as washing events for a compressor of a gas turbine. An objective function including fuel/power price forecasts is evaluated/optimised in order to determine the advisability of a washing event. The cost function depends on a state vector comprising both Integer/Boolean and continuous state variables which are interconnected via a set of rules or constraints. Mixed Integer Programming (MIP) is a used for implementing the inventive procedure.

17 Claims, 2 Drawing Sheets

OTHER PUBLICATIONS

"On the Interactions of Chemical-Process Design under Uncertainty and Maintenance-Optimisation"; Costantinos G. Vassiliadis, and Efstratios N. Pistikopoulos; Imperial College, London, 1998.*

"Continuous Time Predictive Maintenance Scheduling for a Deteriorating System"; L. Dieulle, C. Berenguer, A. Grail, and M. Roussignol; Proceedings Annual Reliability and Maintainability Symposium; 2001.*

Dieulle L. et al., "Continuous time predictive maintenance scheduling for a deteriorating system", Jan. 22, 2001, pp. 150-155.

S.C. Gulen et al., Real Time On-Line Performance Diagnostic of Heavy Duty Industrial Gas Turbines Transactions of The ASME, vol. 124, Oct. 2002, pp. 910-921.

Vassiliadis C. G. et al., On the interactions of chemical-process design under uncertainty and maintenance-optimisation, 1998, pp. 302-307.

Dieulle L. et al., "Continuous time predictive maintenance scheduling for a deteriorating system", Jan. 22, 2001, pp. 150-155.

S.C. Gulen et al., Real Time On-Line Performance Diagnostic of Heavy Duty Industrial Gas Turbines Transactions of The ASME, vol. 124, Oct. 2002, pp. 910-921.

Vassiliadis C. G. et al., On the interactions of chemical-process design under uncertainty and maintenance-optimisation, 1998, pp. 302-307.

* cited by examiner

METHOD OF CONVERTING A RESOURCE INTO A PRODUCT

This disclosure claims priority under 35 USC §119 to European Application No. 03405654.4, filed Sep. 8, 2003, and under 35 USC §371 to International Application No. PCT/CH2004/000566, filed Sep. 8, 2004, the contents of which are incorporated herein by reference.

FIELD OF THE INVENTION

The invention relates to the field of converting a resource into a product via and maintenance scheduling for engines suffering a continuous degradation in performance, and in particular to the scheduling of maintenance actions for a compressor of a gas turbine.

BACKGROUND OF THE INVENTION

The performance of a gas turbine is subjected to deterioration due to compressor fouling and corrosion, inlet filter clogging, thermal fatigue, and oxidisation of hot gas path components. The performance deterioration results in loss in power output and/or increase in fuel consumption and impacts both revenues and equipment life cycle costs.

The performance degradation attributed to compressor fouling is mainly due to deposits formed on the blades of the first compressor stages by particles carried in by the air that are not large enough to be blocked by the inlet filter. These particles may comprise sludge or pollen in rural areas, dust, rust and soot particles or hydrocarbon aerosols in industrials areas, salt in coastal areas or simply water droplets. The deposits result in a reduction of compressor mass flow rate, efficiency, and pressure ratio. As about half of the energy contained in the fuel burned by the gas turbine is consumed by the compressor, a noticeable increase in fuel consumption has to be accepted in order to maintain a constant power output.

Compressor fouling is a recoverable degradation that can be alleviated by periodic on-line or off-line compressor washes. In an on-line wash, distilled or at least demineralised water is injected into the compressor while the gas turbine is running. Complete performance recovery can only be achieved by an off-line wash (requiring plant shutdown) where distilled water, together with a detergent, is sprayed into the gas turbine and stays in contact with the compressor blades and vanes. Currently, the washing schedule is made manually by the utility operator and the washing is typically scheduled in connection with other planned shutdowns. Alternatively, the washing is scheduled in the slack periods, when the revenues from electricity sales are low.

Inlet filter clogging reduces the gas turbine air flow and compressor inlet pressure and thus adversely affects gas turbine performance. Replacing the old filter with a new or cleaned one can recover the lost performance. However the performance degradation associated with frictional wear and/or concerning hot gas path components is referred to as non-recoverable, the only remedy being an engine overhaul.

In the article "Real Time On-Line Performance Diagnostics of Heavy-Duty Industrial Gas Turbines" by S. C. Gülen et al., Journal of Engineering for Gas Turbines and Power, October 2002, Vol. 124, p. 910-921, a maintenance schedule for the compressor washing and inlet filter replacement balances the maintenance costs against lost revenue and extra fuel costs. The optimal future time to do the washing is found when the integrated cost due to compressor fouling (extra fuel burned and power lost) equals the costs for the maintenance process. However, neither the evolution of the fuel price in the near future, nor logical constraints such as planned outages and part load, are taken into account.

Compressor maps are graphical representations of functions or functional relationships relating e.g. the mass flow of a working fluid through a compressor or turbine and/or the efficiency of the compressor or turbine process to measured or estimated process states such as temperatures, pressures or speeds. Generally, the manufacturers of the compressors or turbines have sufficient experimental data to estimate e.g. the non-recoverable efficiency degradation, also known as "guarantee curve". On the other hand, the turbine operator himself can approximate or estimate the non-recoverable efficiency $\eta_E$, e.g. by means of an interpolation of a particular process state recorded at the restart following a limited number of off-line washing events.

In the European Patent Application 02405844.8 a method based on State Augmented Extended Kalman Filtering techniques is disclosed which allows to obtain and continuously update estimates of the above compressor maps or functions on-line, i.e. during process operation. In the Kalman Filter, the computed output is compared with the measured outputs and the actual (i.e. taking into account recoverable degradation) efficiency $\eta$ as an augmented state (parameter estimate) is updated. One important aspect in this procedure is the correction of all measured data to standard temperature and pressure conditions for dry air. Despite of the fact that the load level may change several times in-between two washing events, the foregoing procedures generally assume the turbine to work constantly on full or base load and do not take into account part load.

In the absence of any maintenance action, both the actual efficiency $\eta$ and the estimated efficiency $\eta_E$ follow an exponential law trend in output degradation. An eventual saturation or levelling off is assumed to be due to the stabilization of the thickness and shape of the blade deposits.

More generally, any system comprising engines or other pieces of equipment that suffer from a continuous degradation in efficiency can be at least temporarily relieved by maintenance actions. However, the scheduling of the latter is not a straightforward task if time-dependent constraints influence on the optimal timing. This is the case in a system that converts a resource into a product where both the resource and the product are each attached different time-dependent properties. These properties are normalized and equivalent to an objective quantity per unit of measure. In the case of a gas turbine as outlined above, the normalized properties are costs or prices per unit of mass or energy (i.e. per kg or per MWh) for the fuel and the electricity generated.

In a different case, the system may comprise a generator and other equipment for producing electrical energy from renewable energy sources such as the sun, wind or water, which are all intermittent or time-dependent by nature. The normalized properties in this case are the natural power, i.e. the energy per unit of time delivered by the resource, and the electrical power produced according to a demand by one or a plurality of consumers.

Because of the decreasing efficiency and the time-dependent normalized properties, the objective quantity introduced above is the subject of a certain balance between the resource end and the product end in the conversion process. There is generally a difference between the amount of the objective quantity entering the system and the amount leaving the system. Correspondingly, the objective quantity may accumulate at the system, or equally, be diverted and used for other purposes than the basic conversion.

DESCRIPTION OF THE INVENTION

It is therefore an object of the invention to maximize, over a predetermined time horizon, the accumulation of an objective quantity at a system converting a resource into a product as described above. These objectives are achieved by a method for converting a resource into a product according to claim 1, a computer program for scheduling a maintenance action for an engine according to claim 1 as well as a method for scheduling a compressor washing event for a compressor of a gas turbine according to claim 12. Further preferred embodiments are evident from the dependent patent claims.

The performance of an engine or other piece of equipment can be improved by a single or a succession of maintenance actions, thus increasing the efficiency of a system comprising the engine and converting or refining a primary resource into a product. An expenditure for the maintenance event and forecasts for the evolution of a time-dependent property of both the resource and the product over a predetermined time horizon are taken into account and constitute the main ingredients of an objective function representing the change in accumulation of an objective quantity at the system due to a continued degradation in performance of the engine. The objective function further depends on at least one state variable related to a maintenance event at a first time step, and is minimized or solved with respect to this state variable in order to determine the advisability and/or type of a maintenance action. Thus, a flexible maintenance scheduling approach is provided, where a future evolution of the respective properties of the resource and the product influences the decision at present, and from which optimised maintenance schemes or plans covering an arbitrary time span are obtained.

In a first embodiment of the invention, the system converts natural power from an intermittent renewable energy source such as the sun, wind or water, into electric power to meet a time-dependent demand in electric power. The objective quantity in this case is energy, and the normalized property per unit time corresponds to the aforementioned natural or electric power. Likewise, the maintenance expenditure is expressed in the same physical units as the objective quantity, i.e. as an amount of energy that has to be spent and thus has to be considered in the overall energy balance. Maximizing the accumulation of the objective quantity according to the invention in this case is equivalent to minimizing the amount of renewable energy needed for conversion and maintenance in order to meet the abovementioned demand in electrical power.

In a second embodiment of the invention, the system converts a more or less permanently available fuel such as gas or oil and represented by a time-dependent disbursement into electricity represented by a time-dependent revenue for the product. The objective quantity in this case are costs, and the change in accumulation of the objective quantity at the system are additional system costs.

In a first preferred variant of the second embodiment of the invention, the maintenance planning takes into account a cost-forecast of a quantitative measure for the product, i.e. the planned output based on a future demand of the product. Hence, fluctuating outputs as well as zero outputs implied by additional constraints such as a system shut-down or a (non-) availability of a maintenance tool or team can be considered in a straightforward way.

In a second preferred variant of the second embodiment of the invention, the objective function involves a sum over the costs at individual future time steps as well as corresponding state variables. The minimization procedure then covers all these state variables at the same time. Thus the impact of future maintenance actions at later time steps is inherently taken into account when evaluating the advisability of a maintenance action at present time.

In addition, maintenance actions can be hard constrained, i.e. the corresponding state variables are set manually and are not determined via the general minimization procedure. Such a predetermined constraint is based on the knowledge of a planned system shut-down or a (non-)availability of a maintenance tool or team at a particular future time step (e.g. on the following Sunday), and its impact for earlier time steps preceding the constraint can be considered in a straightforward way.

In a further preferred embodiment of the second embodiment of the invention, two or more different types of maintenance actions are provided and represented by two or more corresponding state variables of preferably Boolean or Integer type. Different costs and performance benefits associated with the plurality of maintenance actions greatly enhance the flexibility of the inventive method and potential savings.

The minimisation procedure of the objective function with respect to an extended state vector comprising both Integer/Boolean state variables and continuous variables has to respect certain rules or constraints interrelating the variables. Mixed Integer Linear Programming (MILP) is then preferably employed for implementing and carrying out the optimisation procedure.

The degrading performance of the engine is approximated via a linear model for an efficiency measure in combination with corresponding rules or constraints. Even a intrinsically nonlinear behaviour of a degradation can be captured without introducing too much complexity during the mathematical/digital implementation of the optimisation procedure.

The inventive method is suited in particular for scheduling the washing events of a compressor of a gas turbine.

BRIEF DESCRIPTION OF THE DRAWINGS

The subject matter of the invention will be explained in more detail in the following text with reference to preferred exemplary embodiments which are illustrated in the attached drawings, of which

DETAILED DESCRIPTION OF PREFERRED EMBODIMENTS

In the following detailed description, a compressor of a gas turbine is the preferred engine in need of regular maintenance actions. As mentioned initially, the inlet filter of this compressor constitutes another such engine having to be replaced according to a certain schedule. The proposed method may equally well be applied to gas pipelines comprising several compressors along the pipeline. These compressors increase the pressure of the gas, resulting an increased mass transport and increased revenues. However, in order to maintain the maximum pressure, the compressors need to be overhauled periodically, generating costs and down-time. The optimum maintenance scheme for these compressors can be determined according to the same general principles as outlined below in the case of a compressor of a gas turbine. Accordingly, it is to be understood that the conversion process referred to includes not only a conversion of the resource into a materially different product, but also a simple transportation of the resource, the difference in cost and price in this case resulting from geographical imbalances.

Figure 1:
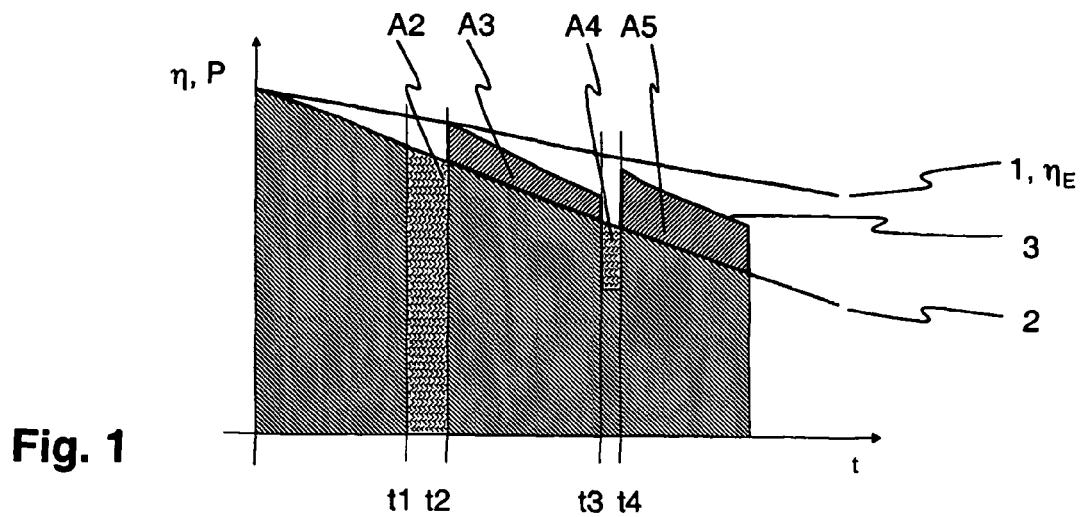
FIG. 1 shows the degradation of compressor efficiency and turbine output.

In order to illustrate the underlying problem, FIG. 1 depicts the compressor efficiency η of a gas turbine as a function of time t and according to an exemplary compressor washing schedule including an off-line washing at $t_1$ and an on-line washing at $t_3$. In particular, curve 1 represents the non-recoverable degradation (in the absence of any blade deposits) and curve 2 represents the recoverable degradation (without any washing at all) of the compressor efficiency. Curve 3 depicts the "real" efficiency according to the exemplary washing schedule, comprising three distinct sections separated by the two washing events. Efficiency curve 3 first follows curve 2, and at the end of the off-line washing at $t_2$, momentarily climbs to curve 1 before degrading again. On the other hand, the gain in efficiency following an on-line washing between $t_3$ and $t_4$ is less pronounced, i.e. curve 1 is not attained at time $t_4$.

At the same time, the power output P at constant fuel rate, i.e. provided the operator does not burn more fuel in order to compensate for any loss in efficiency in order to fulfil his contracts, follows a similar trend as the efficiency curves. During the off-line washing, no output power is produced, i.e. the hatched energy area A2 is "lost" in terms of revenues. However, following the first wash, the output power is increased, i.e. the area A3 is gained. During the on-line wash between $t_3$ and $t_4$, power is still produced at part load (energy area A4), but the gain (area A5) is less pronounced. Comparing the energy areas allows to crudely approximate the economical impact of the washing events. However, in reality, the optimisation procedure has to consider other costs associated with the washing, such as the consumption of the washing chemicals and the usage of material due to the shutdown and startup operations, e.g. the equivalent operating hours (EOH) associated therewith.

The optimisation problem includes the following variables:

$t_i$=Time (e.g. hours) at optimisation step i.
$C_1(t_i)$=Predicted cost ($) of chemicals, water and energy as well as predicted equipment lifetime costs related to off-line washing at time $t_i$
$C_2(t_i)$=Predicted cost ($) of chemicals, water and energy as well as predicted equipment lifetime costs related to on-line washing at time $t_i$
$δ_1(t_i)$=Boolean variable. Equals 1 if off-line washing made at time $t_i$, 0 otherwise
$δ_2(t_i)$=Boolean variable. Equals 1 if on-line washing made at time $t_i$, 0 otherwise
$P_{PWR}(t_i)$=Planned or forecasted power output (MW) at time $t_i$
$P_{Price}(t_i)$=Predicted sales price ($/MWh) for produced or acquired power at time $t_i$
$D_1(t_i)$=Predicted duration (hours) of an off-line washing at time $t_i$
$D_2(t_i)$=Predicted duration (hours) of an on-line washing at time $t_i$
$C_{fuel}(t_i)$=Predicted fuel costs ($/kg) at time $t_i$
$Δf_{fuel}(t_i,η(t_i),P_{PWR}(t_i))$=Modelled additional fuel flow (kg/hour) due to degradation as a function of efficiency η and power output at time $t_i$
$η_E(t_i)$=Predicted expected (isentropic) efficiency at time $t_i$
$η(t_i)$=Predicted actual (isentropic) efficiency at time $t_i$ The expected efficiency $η_E$ is the efficiency that a clean compressor would yield and which can only be achieved after an off-line washing. The degradation of $η_E$ is illustrated by the slowly decreasing curve 1 in FIG. 1, and cannot be recovered simply by a washing process. The actual efficiency η is the expected efficiency $η_E$ minus a recoverable performance degradation since the last washing.

Constraints representing e.g. real physical or logical facts interrelate the abovementioned variables and/or translate into corresponding boundary conditions or rules. By way of example, if there is a planned plant shutdown at time $t_i$, the planned power output $P_{PWR}(t_i)$ will be zero. Furthermore, as on-line and off-line washing cannot be made at the same time step, the following rule R1 will be needed:

$$0 >= δ_1(t_i) + δ_2(t_i) >= 1.$$ (R1)

An instantaneous cost function at time step $t_i$ can now be defined as follows:

$$C(t_i) = C_1(t_i)δ_1(t_i) + (P_{PWR}(t_i)D_1P_{Price}(t_i)δ_1(t_i) + C_2(t_i)δ_2(t_i) + (ΔP_{PWR}(t_i)D_2P_{Price}(t_i))δ_2(t_i) + C_{fuel}(t_i)f_{fuel}(t_i)(t_{i+1}-t_i)(1-δ_1)$$

The first and third terms represent the costs in resources of an off-line or on-line washing event, respectively. The second and forth terms represent the cost due to the "lost" output power, or the disbursements of the operator for power acquired from a second source. $ΔP_{PWR}$ indicates the possibility of a reduced, albeit non-zero, power output during on-line washings. The fifth term equals the fuel costs due to continued operation, based on the power $P_{PWR}$ to be delivered and the actual efficiency η via the modelled fuel flow $f_{Fuel}$.

The benefits of a compressor washing is the ability to produce the future power output with less fuel. A prospective cost function taking into account the effect of a washing at time $t_i$ in future time steps $t_j$ is defined as follows.

$$R(t_i) = \sum_{t_j}^{N_j} C_{fuel}(t_j) Δf_{fuel}(t_j, η(t_j), P_{PWR}(t_j))(t_{j+1} - t_j)$$

This prospective cost function relies on the extra fuel flow due to the difference between the actual compressor efficiency η and the nonrecoverable efficiency $η_E$. The time steps $t_j$ have to be carefully chosen and generally comprise only a limited number of terms.

An objective function F as the sum of the two aforementioned terms is then subject to an optimisation criterion which aims at minimising the overall costs over a predefined and limited time horizon $N_i ≧ 1$, i.e.:

$$F(δ_1, δ_2) = \sum_i^{N_i} (R(t_i) + C(t_i))$$

$$\min[F(δ_1, δ_2)]$$

Taking into account all relevant rules, constraints or boundary conditions, the Boolean variables $δ_1(t_i)$ and $δ_2(t_i)$, i=1 . . . $N_i$, are to be solved for and the maintenance schedule set up correspondingly. The indices i and j as well as the number of terms $N_i$, $N_j$ in the above expressions for F and R, respectively, are generally different from one another. If the model for fuel flow is calculated on an hourly basis (j-index in the prospective cost function R) while the optimisation problem is computed on a daily basis (i-index in the objective function F), then the sum for R will typically contain $N_j$=24 elements.

Preferably, from the optimisation procedure outlined above, only the optimal solution for the first time step at $t_1$ (i.e.

$\delta_1(t_1)$ and $\delta_2(t_1)$) is retained and all further solutions at chronologically later time steps $t_i$, $i=2 \ldots N_t$ are disregarded. Subsequently and/or following the execution of a maintenance action according to the solution at $t_0$, costs and price forecasts are readjusted and degradation values/rates are corrected if possible/necessary. The time horizon is shifted one step forward (hence the sum for the objective function F still comprises $N_t$ terms) and the optimisation problem is repeated with the actual efficiency $\eta$ at $t_2$ as a starting value. Advantageously, the procedure may be repeated in advance for e.g. every day of a month, and a maintenance schedule for a longer period of time may thus be generated.

In the following, further details, aspects and/or simplifications of the inventive method will be presented.

In order to estimate the dependence of the fuel flow $f_{Fuel}$ on the efficiency and thus to compute the benefits in fuel savings after a washing, the following equations are needed:

$$f_{fuel} = \frac{1}{C_R}(\text{Power} + P_{PWR})$$

$$\text{Power} = (T_{ac} - T_{amb})f_a C_a$$

$$(T_{ac} - T_{amb}) = \frac{1}{\eta_{is}}(T_{is} - T_{amb})$$

where Power is the power consumed by the compressor (MW), $P_{PWR}$ is the total output power from the plant (MW), $C_g$ is the fuel capacity (MWh/kg), $C_a$ is the specific heat of the compressor air (MWh/(kgK)), $f_a$ is the massflow of the compressor air, $T_{ac}$ and $T_{amb}$ are the temperature at the compressor outlet and inlet, respectively, and $\eta_{is}$ is the compressor isentropic efficiency.

If an offline washing is made, the efficiency increases from $\eta$ to $\eta_E$. As the compressor degradation due to dirt particles on the compressor blades is typically in the order of 1-2%, the fuel benefit model assumes that $\eta$ and $\eta_E$ do not differ greatly and that in a first approximation, $f_a$ and $T_{is}$ are the same for $\eta$ and $\eta_E$. It is further assumed that $P_{PWR}$ is constant and independent of the compressor efficiency. Hence, $$\Delta f_{fuel} = \frac{1}{C_g}f_a C_a (T_{is} - T_{amb})\Delta\left[\frac{1}{\eta_{is}}\right]$$

In a second approximation, a nominal efficiency variable $\eta_0$ known from e.g. standard compressor maps and a constant $\gamma(0<\gamma<1)$ describing the effectiveness of the online washing operation ($\gamma=1$ for offline washing) are introduced, and the final fuel benefit model is then given by.

$$\Delta f_{fuel} \approx \frac{1}{C}\text{Power} * \frac{\gamma}{\eta_0}(\eta_E - \eta)$$

Both the actual efficiency $\eta$ and the estimated efficiency $\eta_E$ do decrease in an exponential-like manner before eventually levelling off. Nevertheless a linear model of efficiency degradation as a function of time and of on/off-line washings, introducing new help variables $\alpha_r$, $\alpha_n$, is capable of reproducing the nonlinear behaviour of the degradation. The parameters of this linear degradation model $\epsilon_r$, $\epsilon_n$, $\gamma$, $\alpha_r(0)$, $\alpha_n(0)$ must be tuned in such a way that the modelled degradation curves for $\eta_E$ and $\eta$ then match the real degradation curves of the compressor under consideration and may be updated frequently.

With the following notation $\alpha_r(0)$=Initial degradation level (recoverable)

$\alpha_n(0)$=Initial degradation level (non-recoverable)

$\alpha_r(t_i)$=recoverable degradation at time i $\alpha_n(t_i)$=non-recoverble degradation at time i $\epsilon_r$=degradation rate (recoverable), $\epsilon_n$=degradation rate (non-recoverable)

$\gamma$=on-line washing effectiveness ($\gamma<1$)

the degradation of the continuous state variables/efficiencies are modelled by the following rules $$\eta(t_{i+1})=\eta(t_i)-\alpha_r(t_i)$$

$$\eta_E(t_{i+1})=\eta_E(t_i)-\alpha_n(t_i) \quad (R2)$$

with the degradation rates (non-negative by definition)

$$\alpha_r(t_{i+1})=\alpha_r(t_i)-\epsilon_r$$

$$\alpha_n(t_{i+1})=\alpha_n(t_i)-\epsilon_n \quad (R3)$$

In the event of a washing process at $t_i$, a predicted increase in isentropic efficiency is modelled by replacing the previously calculated values as follows:

$$\delta_1(t_i)=1 \rightarrow \eta(t_i)=\eta_E(t_i)\alpha_n(t_i)=\alpha(0)$$

$$\delta_2(t_i)=1 \rightarrow \eta(t_i)=\eta(t_i)+\gamma(\eta_E(t_i)-\eta(t_i))\alpha_n(t_i)=\alpha(0) \quad (R4)$$

In a more refined version of the inventive method known as "hybrid system model", an extended state vector x including, apart from the washing states $\delta_1$ and $\delta_2$ as introduced above, further Boolean states $\delta_3$ and $\delta_4$ representing a normal working state and an idle state respectively. In addition, the non-integer or continuous variables $\eta$ and $\eta_2$ for current and recoverable efficiency, and $z_1$, $z_2$, $z_3$ for the cost of online washing, offline washing and the cost of extra fuel due to degradation, are introduced. The objective function becomes $F(x)=z_1+z_2+z_3$, with $x=(\delta_1, \delta_2, \delta_3, \delta_4, \eta, \eta_2, z_1, z_2, z_3)$ the extended state vector.

The above rules R2, R3, R4 for $\eta$ and $\eta_E$ remain valid, while the original rule R1 is to be replaced by the modified rule R1' of the form $\delta_1+\delta_2+\delta_3+\delta_4=1$. As above, $z_1=\delta_1 C_1$ and $z_2=\delta_2 C_2$, whereas the rule for $z_3$ is significantly simplified and takes the linear form known from the fuel benefit model above, i.e. $z_3=P_5(\eta-\eta_2)$, where $P_5$ is the product of the fuel price, the time step, and the constants in the expression for $\Delta f_{fuel}$ derived above. In addition, the time steps of the optimisation problem and the fuel benefit model are preferably assumed to be of equal length and identical to one day.

The decision problem is formulated as a receding horizon optimisation (also known as Model-Predictive Control). The Integer/Boolean and continuous variables are comprised in a state vector x, which is then duplicated for each time step $t_j$ within a predetermined finite time horizon. In addition, the aforementioned rules R1 . . . R4 as well as the objective function F are duplicated for each time step. In the subsequent Mixed Integer Programming (MIP) approach, only a limited amount of N time steps ahead are considered. The optimal solution for the first time step at $t_i$ is retained and executed by the plant operator. After the execution has completed, the plant operator readjusts costs and price forecasts and corrects degradation values/rates if possible/necessary, shifts the time horizon one step forward and repeats the optimisation problem with the actual efficiency η at $t_i$ as a starting value. If a maintenance schedule for a longer period of time is required, the procedure/operator will iterate through the calendar day by day, shifting the time horizon one step forward and retaining only the optimal solution for the first time step in each iteration. Again, the latter is recycled as the initial value for the next iteration step.

The procedure outlined in the foregoing involves both integer (such as δ) and continuous (such as η or the cost variables z) state variables, and is therefore based on a hybrid or mixed logical dynamical system model. In addition to the optimisation function, the abovementioned rules, constraints or boundary conditions have to be observed. As long as both of them are linear, as e.g. the fuel benefit model and the approximated efficiency degradation disclosed above, the procedure is called a Mixed Integer Linear Programming (MILP) approach or optimisation framework.

Given a linear dependence of the objective function F on a state vector x comprising both integer and continuous variables, a cost vector g can be defined and the cost function F is rewritten as $F(x)=g^T x$. With the inequalities building up a constraint matrix A, the MILP formulation for the state vector x is as follows:

Min F(x), subject to Ax<b

Alternatively, if the cost function F involves quadratic terms in the state vector x as represented by a cost matrix Q, Mixed Integer Quadratic Programming (MIQP) might be applied. The objective function takes the form $F(x)=x^T Q x + g^T x$.

The cost matrix Q, cost vector g and the constraint matrix A are fed to a robust and reliable optimisation problem solver, such as e.g. the commercially available optimiser for solving linear, mixed-integer and quadratic programming problems called CPLEX (http://www.ilo.com/products/cplex/). Alternatively, if the optimisation function F and/or the constraints were allowed to involve general nonlinear terms in the state vector x, mixed integer nonlinear programming (MINLP) might be applied.

Figure 2:
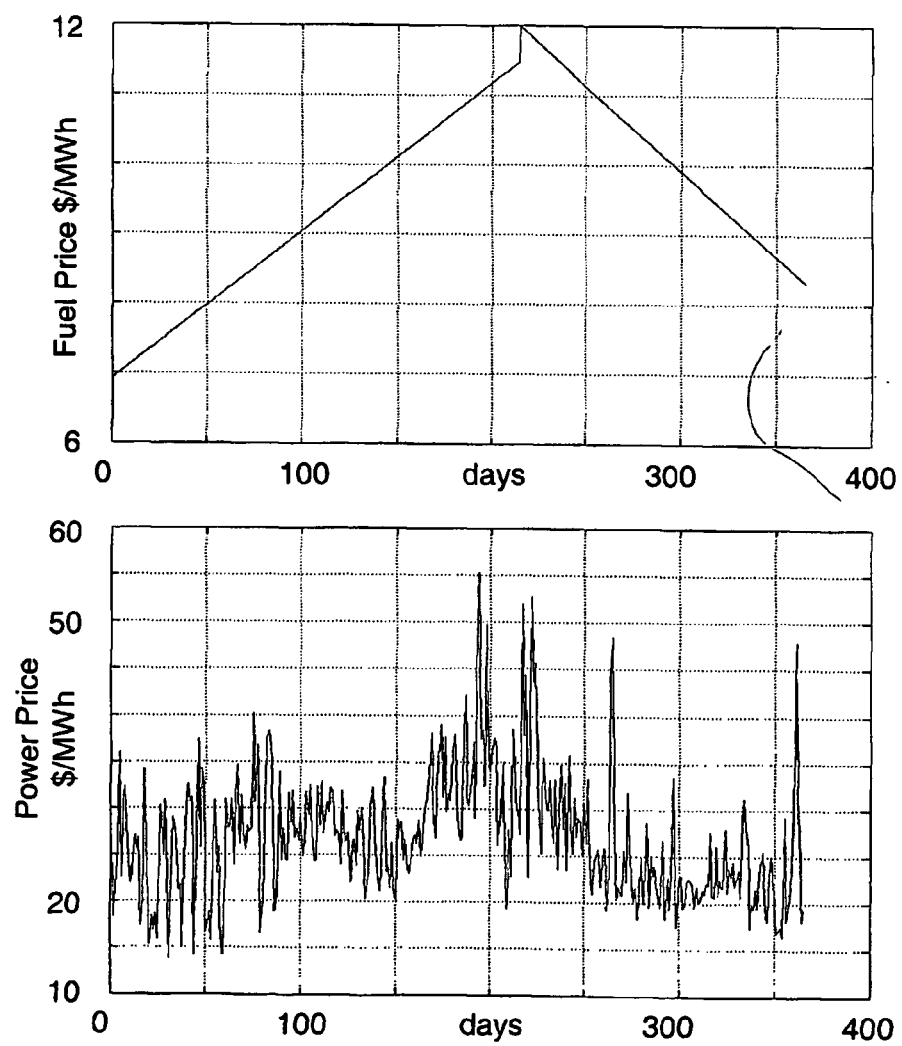
FIG. 2 is an example of a cost/revenue forecast.

The availability of reliable forecasts for the prices of power (to be sold) and fuel (to be purchased) is essential for the successful implementation of the method. Such price forecasts can be bought commercially from various suppliers (http://www.bmreports.com), and example being depicted in FIG. 2. On the top graph, a fuel price forecast $C_{fuel}$ is shown, and on the bottom graph, a power price forecast $P_{Price}$ ($/MWh) for one year.

Figures 3, 4:
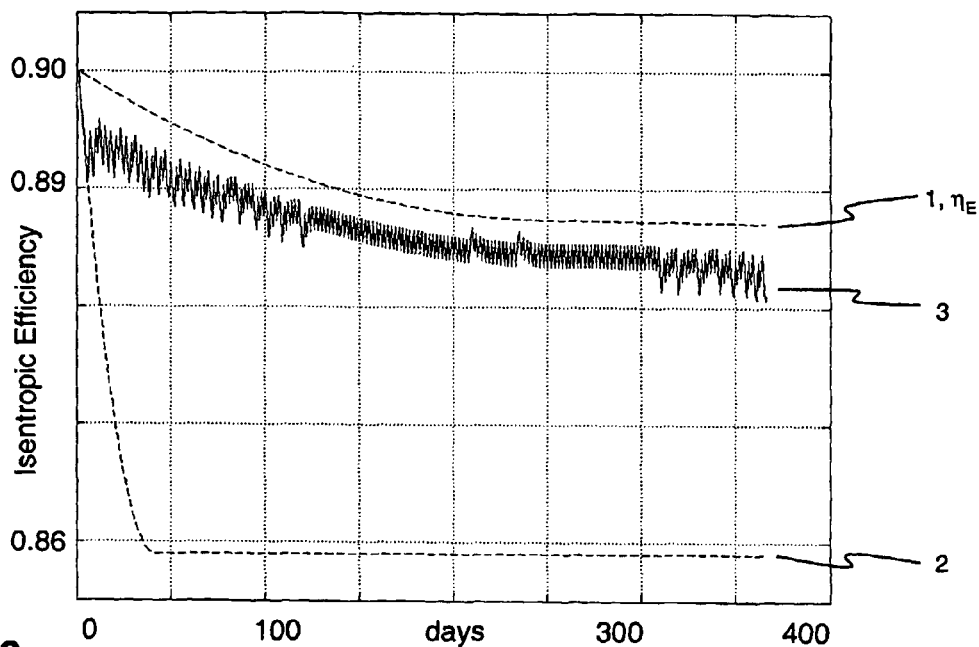
FIG. 3 depicts the evolution of the compressor efficiency according to the invention.
FIG. 4 is a calendar with scheduled washing events.

The benefit of the inventive method is visible from FIG. 3. The top curve 1 shows the non-recoverable efficiency $\eta_E$, while the bottom curve 2 shows the efficiency degradation when every day is hard constrained to normal operation and no washing at all is foreseen. The model converges to an efficiency difference of about 3% between the two steady-state efficiency levels. The objective function with everyday washing amounts to a certain amount of money spent mainly on chemicals, whereas without any washing these costs roughly double. This amount corresponds to the extra money spent on fuel that the plant owner must pay due to the difference of compressor efficiency compared to the nonrecoverable efficiency level. The curve 3 in the middle shows the same resulting efficiency when all the hard constraints are removed and the system is determining the frequency and type of washing events, resulting in an increased online washing frequency when the fuel prices are high (around day 200). The minimized objective function in this case comprises a combination of outlays on washing detergents and on extra money spent on fuel due to degradation. Because the cost of an offline washing is very high due to the loss of electricity sales, no offline washings is made in this example.

FIG. 4 finally shows an optimised washing schedule for the month of April 2003. The days marked with a tick (√) stand for normal operation of the system, whereas the symbol Ø signifies online washing. The schedule shows that the optimal washing frequency is every 2nd or 3rd day, depending on the fuel prices. Again, no offline washing is envisaged, as the costs associated with offline washing are so high (due to lost power sales) that it is never economical to shut down the plant only for the washing. However, the utility owner can hard-constrain the optimiser to do offline washings on specific calendar days when the plant is shut down for other reasons, for example maintenance of the generator.

To summarize, in the inventive method of scheduling a maintenance action for an engine suffering from a degradation in performance, wherein the engine is part of a system converting a resource into a product, and wherein the maintenance action increases the performance of the engine, the following steps are performed:

a) introducing a state variable ($\delta_1$) representing a maintenance action at a first time step ($t_1$) and an efficiency measure (η) representing the degrading performance of the engine, b) providing a cost-estimate of a price for the maintenance action ($C_1$) and an initial value for the efficiency measure ($\eta(t_i)$), and providing for $N_j>1$ discrete time steps ($t_j$) into the future, a cost-forecast of a disbursement ($C_{fuel}(t_j)$) for the resource and of a revenue ($P_{Price}(t_j)$) for the product, c) setting up an objective function F including the additional system costs related to the degradation in performance, based on the cost-estimate ($C_1$), the efficiency measure (η), the cost-forecasts ($C_{fuel}(t_j)$, $P_{Price}(t_j)$), and the state variable ($\delta_1$), d) minimising the objective function F with respect to the state variable ($\delta_1$), and scheduling a maintenance action at the first time step ($t_1$) accordingly.

In this way, a flexible and economically optimised scheduling approach is provided, where a future evolution of the market prices influences the decision at present, and from which optimised maintenance schemes or plans covering an arbitrary time span are obtained.

The invention claimed is:

1. A method of converting a resource into a product, wherein the resource and the product are each represented by a time-dependent property ($P_{IN}$, $C_{fuel}$; $P_{OUT}$, $P_{Price}$) equivalent to an objective quantity per unit of measure, wherein a performance of a system converting the resource into the product is represented by an efficiency measure (η), and wherein the performance is degrading continuously and can be increased by a maintenance action applied to the system, wherein the method comprises:

a) introducing a state variable ($\delta_1$) representing a maintenance action performed on an engine at a first time step ($t_1$) and estimating a maintenance expenditure ($C_1$) for said maintenance action, b) providing an initial value for the efficiency measure ($\eta(t_1)$) of the engine as well as a model of the system for predicting, for $N_j>1$ discrete time steps ($t_j$), the efficiency measure ($\eta(t_j)$) both with and without said maintenance action, c) providing, for $N_j>1$ discrete time steps ($t_j$), a forecast of the time-dependent property ($P_{IN}(t_j)$, $C_{fuel}(t_j)$) representing the resource and a forecast of the time-dependent property ($P_{OUT}(t_j)$, $P_{Price}(t_j)$) representing the product, d) setting up an objective function F including a change in accumulation of the objective quantity at the system related to the degradation in performance of the engine, and based on the maintenance expenditure ($C_1$), the efficiency measure ($\eta$), the property forecasts ($P_{IN}(t_j)$, $C_{fuel}(t)$; $P_{OUT}(t_j)$, $P_{Price}(t_j)$), and the state variable ($\delta_1$), and e) minimizing the objective function F with respect to the state variable ($\delta_1$), and scheduling a maintenance action for the engine at the first time step ($t_1$), wherein steps a) through e) are performed in a computer.

2. The method according to claim 1, wherein the resource is an intermittent renewable energy source represented by a time-dependent supply power ($P_{IN}$) and wherein the product is electricity represented by a time-dependent demand power ($P_{OUT}$).

3. The method according to claim 1, wherein step a) comprises providing a cost-estimate of a price for the maintenance action ($C_1$) of the engine, step c) comprises providing a cost-forecast of a disbursement ($C_{fuel}(t_j)$) representing the resource and a cost-forecast of a revenue ($P_{Price}(t_j)$) for the product, and step d) comprises setting up an objective function F that includes additional system cost related to the degradation in performance of the engine as the change in accumulation of the objective quantity at the system.

4. The method according to claim 3, wherein for the $N_j>1$ discrete time steps ($t_j$) into the future, a forecast of a quantitative measure of the product ($P_{PWR}(t_j)$) is provided and wherein the objective function F is also based thereupon.

5. The method according to claim 3, wherein the objective function F comprises costs ($C(t_i)+R(t_i); z_4$) at $N_i>1$ future time steps ($t_i$), as well as state variables ($\delta_1 t_i$) representing each maintenance action at a corresponding time step ($t_i$), and wherein the objective function F is minimized with respect to all these state variables ($\delta_1 t_i$).

6. The method according to claim 5, wherein the minimization procedure is constrained in the case of a predetermined maintenance action at a time step ($t_m$) by setting the corresponding state variable ($\delta_1 t_m$) to a fixed value.

7. The method according to claim 5, wherein at least two different maintenance actions with different impact on the performance of the engine are possible and wherein their presence or absence is represented by at least two different Boolean state variables ($\delta_1 \delta_2$).

8. The method according to claim 7, wherein an extended state vector (x) comprises the Boolean state variables ($\delta_1$ $\delta_2$) as well as continuous state variables ($\eta$, $\eta_2$, $z_1$, $z_2$, $z_3$), and wherein rules (R1, R1', R2-R4) interrelate the Boolean and continuous state variables.

9. The method according to claim 7, wherein the degradation in performance of the engine is modelled via a linear model for the efficiency measure ($\eta$) resulting in a set of corresponding rules (R2-R4) interrelating the efficiency measure ($\eta$) with the Boolean state variables ($\delta_1$ $\delta_2$).

10. The method according to claim 3, wherein the system is a gas turbine converting gaseous fuels as a resource into mechanical or electrical energy as a product, and wherein the engine is a compressor suffering a degradation in efficiency ($\eta$) and the maintenance action is a compressor washing event.

11. A method of scheduling a compressor washing event for a system having a compressor suffering from a degradation in efficiency ($\eta$), wherein the compressor is part of a gas turbine converting gaseous fuels into mechanical or electrical energy, and wherein the compressor washing event increases the efficiency of the compressor, comprising the steps of a) introducing a state variable ($\delta_1$) representing a compressor washing event at a first time step ($t_1$), b) providing a cost-estimate of a price for the compressor washing event ($C_1$) and an initial value for an efficiency measure ($\eta(t_1)$) as well as a model of the system for predicting, for $N_j>1$ discrete time steps ($t_j$), the efficiency measure ($\eta(t_j)$) both with and without said maintenance action, and providing for $N_j>1$ discrete time steps ($t_j$), a cost-forecast of a disbursement ($C_{fuel}(t_j)$) for the gaseous fuels and of a revenue ($P_{Price}(t_j)$) for the mechanical or electrical energy, c) setting up an objective function F that includes additional system costs related to the degradation in efficiency, based on the cost-estimate ($C_1$), the efficiency ($\eta$), the cost-forecasts ($C_{fuel}(t_j)$, $P_{Price}(t_j)$), and the state variable ($\delta_1$), and d) minimizing the objective function F with respect to the state variable ($\delta_1$), and scheduling a compressor washing event at the first time step ($t_1$), wherein steps a) through d) are performed in a computer.

12. The method according to claim 4, wherein the system is a gas turbine converting gaseous fuels as a resource into mechanical or electrical energy as a product, and wherein the engine is a compressor suffering a degradation in efficiency ($\eta$) and the maintenance action is a compressor washing event.

13. The method according to claim 5, wherein the system is a gas turbine converting gaseous fuels as a resource into mechanical or electrical energy as a product, and wherein the engine is a compressor suffering a degradation in efficiency ($\eta$) and the maintenance action is a compressor washing event.

14. The method according to claim 6, wherein the system is a gas turbine converting gaseous fuels as a resource into mechanical or electrical energy as a product, and wherein the engine is a compressor suffering a degradation in efficiency ($\delta_1$) and the maintenance action is a compressor washing event.

15. The method according to claim 7, wherein the system is a gas turbine converting gaseous fuels as a resource into mechanical or electrical energy as a product, and wherein the engine is a compressor suffering a degradation in efficiency ($\eta$) and the maintenance action is a compressor washing event.

16. The method according to claim 8, wherein the system is a gas turbine converting gaseous fuels as a resource into mechanical or electrical energy as a product, and wherein the engine is a compressor suffering a degradation in efficiency ($\eta$) and the maintenance action is a compressor washing event.

17. The method according to claim 9, wherein the system is a gas turbine converting gaseous fuels as a resource into mechanical or electrical energy as a product, and wherein the engine is a compressor suffering a degradation in efficiency ($\eta$) and the maintenance action is a compressor washing event.

* * * * *